United States Patent
Park et al.

(10) Patent No.: US 6,967,935 B1
(45) Date of Patent: Nov. 22, 2005

(54) APPARATUS AND METHOD FOR ACCESS COMMUNICATION IN CDMA COMMUNICATION SYSTEM

(75) Inventors: Jin-Soo Park, Seoul (KR); Hi-Chan Moon, Seoul (KR); Jae-Min Ahn, Seoul (KR)

(73) Assignee: Samsung Electronics Co., Ltd., (KR)

( * ) Notice: Subject to any disclaimer, the term of this patent is extended or adjusted under 35 U.S.C. 154(b) by 1097 days.

(21) Appl. No.: 09/641,173

(22) Filed: Aug. 17, 2000

(30) Foreign Application Priority Data

Aug. 17, 1999 (KR) .............................. 1999-34015

(51) Int. Cl.[7] ............................................. H04B 7/216
(52) U.S. Cl. .................... 370/320; 370/335; 370/345; 370/342; 370/349; 370/438; 370/439; 370/441
(58) Field of Search ................................ 370/329, 337, 370/347, 335, 342, 311, 458, 461, 462, 443, 370/431, 349, 437, 442, 449, 320, 345, 441, 370/438, 439

(56) References Cited

U.S. PATENT DOCUMENTS

| | | | | |
|---|---|---|---|---|
| 5,689,502 | A  * | 11/1997 | Scott ........................... | 370/281 |
| 6,163,533 | A  * | 12/2000 | Esmailzadeh et al. ....... | 370/342 |
| 6,374,085 | B1 * | 4/2002 | Saints et al. .................. | 455/69 |
| 6,381,229 | B1 * | 4/2002 | Narvinger et al. ........... | 370/328 |
| 6,493,334 | B1 * | 12/2002 | Krzymien et al. ........... | 370/342 |
| 6,519,233 | B1 * | 2/2003 | Gutierrez ...................... | 370/320 |
| 6,577,610 | B1 * | 6/2003 | Kronz ........................... | 370/322 |
| 6,606,313 | B1 * | 8/2003 | Dahlman et al. ............. | 370/347 |
| 6,614,779 | B1 * | 9/2003 | Gutierrez et al. ............ | 370/350 |
| 6,643,275 | B1 * | 11/2003 | Gustafsson et al. ......... | 370/328 |
| 6,674,739 | B1 * | 1/2004 | Lee et al. ..................... | 370/320 |
| 6,741,861 | B2 * | 5/2004 | Bender et al. ............... | 455/450 |
| 6,882,841 | B1 * | 4/2005 | Youn ............................ | 455/434 |
| 2002/0067701 | A1 * | 6/2002 | Chen at al. ................... | 370/318 |
| 2004/0057397 | A1 * | 3/2004 | Kanterakis et al. .......... | 370/320 |

OTHER PUBLICATIONS

Songson Sun; Krzymien, W.A.; Darian, B.; A new efficient contentionless access protocol for packet data transmission in CDMA systems, Vehicular Technology Conference Proceedings, May 15-18, 2000, IEEE 51st, Vol.: 1 , p. 36-40.*

* cited by examiner

*Primary Examiner*—Seema S. Rao
*Assistant Examiner*—Puneet Bhandari
(74) *Attorney, Agent, or Firm*—Dilworth & Barrese LLP (57) ABSTRACT

A method for performing communication between a base station and a mobile station through a designated channel is disclosed. The method comprises transmitting an access parameter message including fields indicating preamble duration and slot duration having a length of a multiple of given slot duration from the base station to the mobile station, the base station previously knowing each start time point of the slots having the multiple slot duration; transmitting a control message including fields indicating a designated channel number and a data rate from the base station to the mobile station over a common channel; receiving, in the mobile station, the control message and transmitting to the base station an access probe including a preamble having the preamble duration and a succeeding response message beginning at one of the start time points of the slots having the multiple slot duration at the data rate through a designated channel associated with the designated channel number in the control message; and determining in the base station whether the preamble of the access probe is received, beginning at each start time point of the slots having the multiple slot duration.

25 Claims, 8 Drawing Sheets

APPARATUS AND METHOD FOR ACCESS COMMUNICATION IN CDMA COMMUNICATION SYSTEM

PRIORITY

This application claims priority to an application entitled "Apparatus and Method for Access Communication in CDMA Communication System" filed in the Korean Industrial Property Office on Aug. 17, 1.999 and assigned Serial No. 99-34015, the contents of which are hereby incorporated by reference.

BACKGROUND OF THE INVENTION

1. Field of the Invention

The present invention relates generally to a communication apparatus and method for a communication system, and in particular, to an access communication apparatus and method.

2. Description of the Related Art

Generally, in TIA/EIA/IS-95 CDMA communication systems, a base station and a mobile station use paging channels and access channels, which are common channels, to exchange data before setting up a voice call. That is, the base station transmits a message to the mobile station over the paging channel and receives a response from the mobile station over the access channel. The mobile station transmits a message to the base station over the access channel and receives a response from the base station over the paging channel. A plurality of paging channels and the access channels may be used. The individual paging channels are identified by Walsh codes and the individual access channels are identified by long codes.

Figure 1:
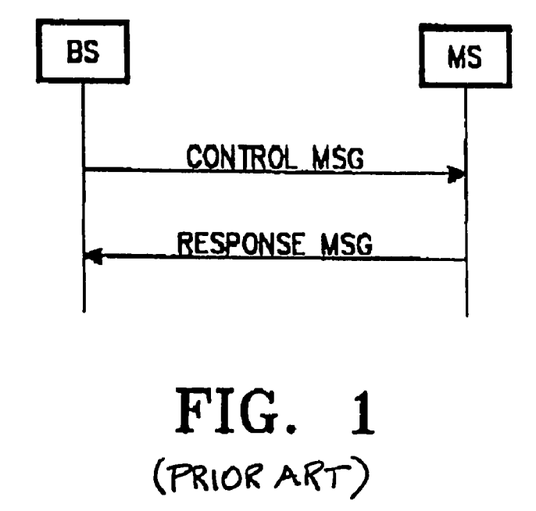
FIG. 1 is a diagram illustrating a procedure for exchanging messages between a base station and a mobile station in a conventional mobile communication system according to the prior art.

FIG. 1 illustrates a conventional procedure for exchanging messages between the base station and the mobile station over the common channels according to the prior art. Referring to FIG. 1, the base station (BS) transmits a control message to the mobile station (MS) over the paging channel, and the mobile station then transmits a response message to the base station over the access channel.

When several mobile stations, which use the same long code, simultaneously transmit messages over the access channel, a message contention occurs between the transmissions on the access channel such that the messages to be transmitted may be lost. Such an access is called "contention based random access".

When a message contention occurs on the access channel, the mobile station retries to gain access to the base station through the access channel. In attempting to gain access, each transmission is called an "access probe", and the access probe is comprised of a preamble and a message. The mobile stations transmit the messages over predetermined access channels, and when a message contention occurs, each mobile station detects the occurrence of the message contention after a lapse of a specific time, performs a randomized delay procedure, and then retransmits the message. Meanwhile, the mobile station initially accesses the base station using a predetermined power level, and upon failure to receive a response from the base station, the mobile station retries an access to the base station at an incrementally increased power level. In this manner, the mobile station attempts to gain access to the access channel at predetermined times. If no access is obtained in the end, this procedure is repeated again from the beginning.

Meanwhile, the mobile station determines a long code to be initially used for the common channel by performing a Hashing function on the available long code items. This long code determining method enables every mobile station to share a long code for the access channel. In addition, the message transmitted over the common channel (or access channel) can be divided into a message generated by the mobile station itself and a response message for a message transmitted from the base station. In the conventional communication system, the two messages are processed on an equal basis.

That is, in the conventional communication system, an access to the base station through the common channel is performed in a random access mode and several mobile stations simultaneously transmit the messages using the same long code, such that the messages to be transmitted may be lost due to message contention. When the message contention occurs, the mobile station accesses the access channel again after a lapse of a specific time to attempt retransmission of the message. Therefore, the base station cannot predict an access time of the access channel, thereby causing an increase in average transmission time, fluctuation of transmission time, and power dissipation of the mobile station.

Further, in the random access mode, since the mobile stations equally use the long codes for the common channel, it is not possible to separately control a probability of the message contention which occurs when each mobile station uses the access channel. In particular, a case where a mobile station initially accesses the base station and where another mobile station responds to a message from the base station are managed on an equal basis. Thus, in the latter case, when the base station is controlling an access mode of the mobile station, under conventional methods no additional advantage is gained.

In addition, a scheme is required in which the message being transmitted over the common channel has a short transmission delay time, so as to perform high-speed data communication in a situation where frequent state transitions occur between one state where the common channel is used during a packet data service and another state where the dedicated channel is used during the packet data service.

To solve this problem, Korean patent application No. 98-10617 discloses a device and method for reducing the access time and increasing the transmission efficiency when the mobile station responds to a message transmitted from the base station in a communication system supporting various services. In the disclosed device, the base station transmits a control message including channel identifier (ID) information, which can be used by the mobile station in responding to the received control message, over the common channel, and the mobile station analyzes the control message received over the common channel and then transmits a response message over a channel designated according to the channel ID information.

Figure 2:
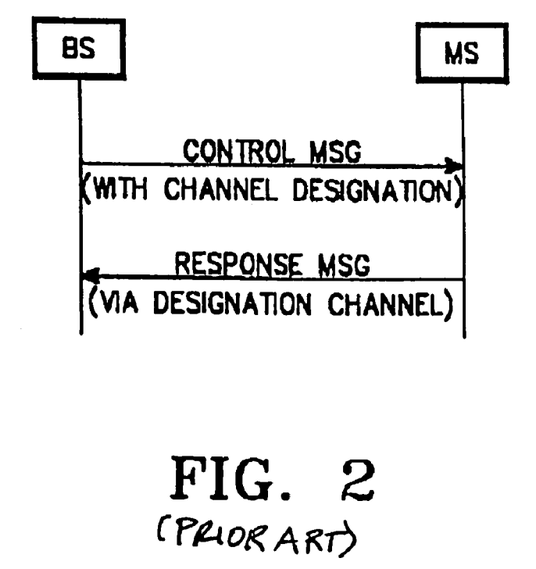
FIG. 2 is a diagram illustrating a procedure for exchanging messages between the base station and the mobile station in a conventional communication system using a designated response mode according to the prior art.

FIG. 2 illustrates a procedure for exchanging messages between the base station and the mobile station, using the conventional designated response mode. Referring to FIG. 2, when the base station transmits a control message with channel information, the mobile station transmits a response message over a designated channel. The designated channel can be determined either by information included in the channel designation information in the control message from the base station or by information (e.g., unique electronic serial number (ESN) of the mobile station) which is previously commonly known to the base station and the mobile station. Here, the channel is identified by the long code.

Figure 3:
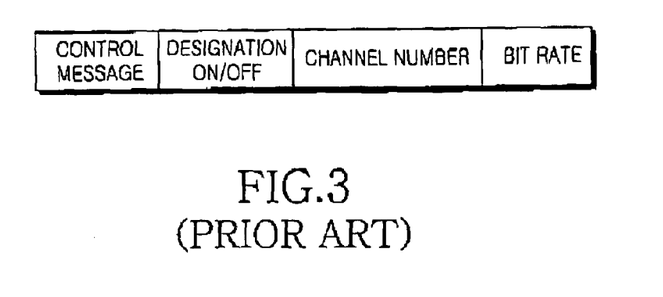
FIG. 3 is a diagram illustrating a conventional control message format of a forward link in a communication system using the designated response mode according to the prior art.

FIG. 3 illustrates a forward link control message transmitted from the base station to the mobile station according to the prior art. The control message includes information about whether the channel is designated or not, channel number and data rate as well as the contents of the control message. Here, the channel number indicates a reverse common channel number (or long code number) and a corresponding power control channel number. When a unique long code of the mobile station is used for the reverse common channel, the channel number is used only for the power control channel number.

In this method, however, the base station must know a transmission start time point where the mobile station transmits a response message for the control message, and to do so, the base station must transmit separate time information to the mobile station. More specifically, the mobile station can start transmission of a preamble and a message at a 1.25 ms boundary based on the system time. Here, the term "1.25 ms boundary" is equivalent to another term "slot boundary" or "start point of slots". Therefore, it is difficult for the base station to detect an exact transmission start time point out of the transmission start time points of the mobile station, which are available every 1.25 ms. Therefore, it is preferable to use a method for designating a transmission start time point of the reverse message for the mobile station. However, the time information generally requires many bits, making it inefficient to include the time information in the control message.

SUMMARY OF THE INVENTION

It is, therefore, an object of the present invention to provide an access communication device and method for a mobile communication system, which can solve the above problems.

It is another object of the present invention to provide a communication device and method for detecting a transmission start time point where a mobile station transmits a response message for a received control message, wherein a base station does not transmit separate time information to the mobile station.

It is yet another object of the present invention to provide a device and method for enabling the base station to designate an access time point of a reverse common channel for the mobile station.

To achieve the above and other objects, a method is provided for performing communication between a base station and a mobile station through a designated channel. The method comprises transmitting an access parameter message including fields indicating preamble duration and slot duration having a length of a multiple of given slot duration from the base station to the mobile station, the base station previously knowing each start time point of the slots having the multiple slot duration; transmitting a control message including fields indicating a designated channel number and a data rate from the base station to the mobile station over a common channel; receiving, in the mobile station, the control message and transmitting to the base station an access probe including a preamble having the preamble duration and a succeeding response message at one of the start time points of the slots having the multiple slot duration at the data rate through a designated channel associated with the designated channel number in the control message; and determining in the base station whether the preamble of the access probe is received, from each start time point of the slots having the multiple slot duration.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail to avoid obscuring the invention in unnecessary detail.

A communication system provides a common channel necessary for transmitting data in a state where a dedicated channel is not yet established. Here, the "dedicated channel" refers to a channel which can be independently used by one mobile station, and the "common channel" refers to a channel which can be used in common by one or more mobile stations. In the description below, the common channel includes a reverse access channel (R-ACH), a reverse common control channel (R-CCCH), and a reverse enhanced access channel (R-EACH).

Figure 4:
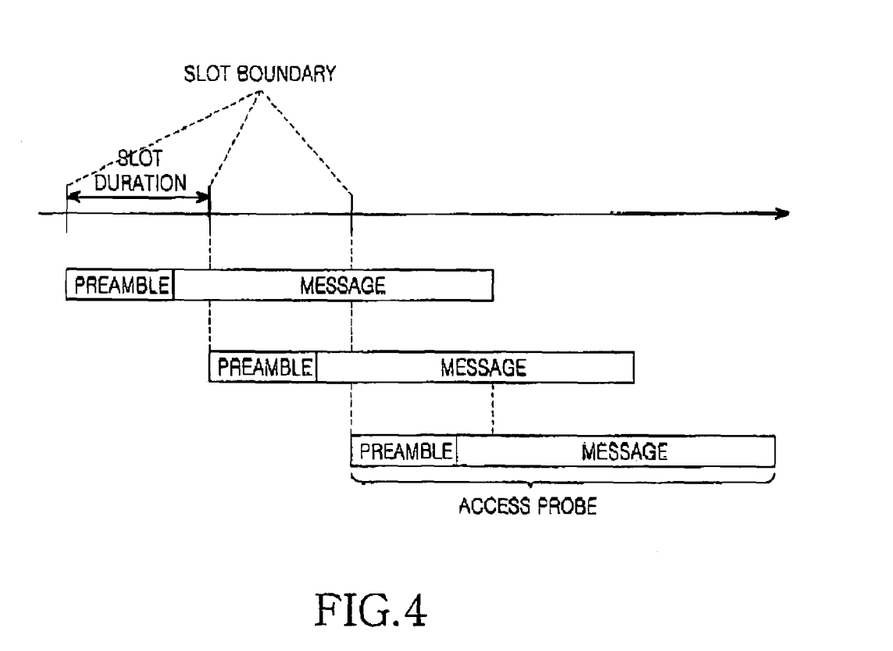
FIG. 4 is a diagram illustrating a transmission time of a reverse common channel according to an embodiment of the present invention.

FIG. 4 illustrates a transmission form viewed on a time axis when a mobile station transmits a response message over a common channel after receiving a control message from a base station according to an embodiment of the present invention. The mobile station starts transmission of the response message with a preamble at the head only at a time point corresponding to the slot boundary. The "slot" refers to a unit transmission time. In accordance with an embodiment of the present invention, the base station determines a specific slot length (or duration) and previously provides the slot length information to the mobile station. For example, the base station may provide the slot length information through an access parameter message which is broadcasted to the mobile station. Meanwhile, the base station may divide the mobile stations into a plurality of groups and designate different slot lengths for the respective groups. Therefore, the mobile stations in the respective groups attempt an access to the base station using the different slot lengths, thereby making it possible to prevent message loss due to message contention.

A length of the preamble can also be previously determined as a specific value, and the base station may previously provide information about the determined preamble length to the mobile station. For example, the base station may provide the preamble length information over the access parameter message which is broadcasted to the mobile station.

Here, the access parameter message includes various information which is required when the mobile station accesses the base station, and is broadcasted from the base station to the mobile station prior to the message exchange of FIG. 2. The access parameter message includes the slot length information and the preamble length information according to an embodiment of the present invention. Here, the slot length information is information for determining a slot boundary where the mobile station attempts an access to the base station, and has a length of a multiple of 1.25 ms. Therefore, the mobile station attempts to access the base station at any one of the slot boundaries according to the slot length, and the base station also determines whether it is accessed by the mobile station, from each time point of the slot boundaries according to the slot length. This is possible because both the base station and the mobile station commonly know the slot length through a previous negotiation (or access parameter message).

Meanwhile, the base station acquires a preamble from the mobile station and detects an end point of the preamble, i.e., a start point of the message from the slot boundary and the preamble length. Since the preamble start point corresponds to the slot boundary and the preamble length is previously known, an end point of the preamble, i.e., the start point of the message is equivalent to (preamble start point)+(preamble length).

Upon failure to acquire the preamble from the mobile station, the base station transmits a preamble acquisition fail indicator to the mobile station. The preamble acquisition fail indicator may be equivalent to transmission ON/OFF or transmission of a power control command in a specific pattern. For example, the specific pattern may include a predetermined number of power-down commands. Here, the number of power-down commands occurring are greater than the number of power-down commands which may occur in normal operation. Further, when transmission of the power control commands is discontinued (OFF), the transmission OFF duration must be long enough for the mobile station to detect. Upon receipt of the preamble acquisition fail indicator, the mobile station re-starts transmission of a response message with a preamble at the head at the next available slot boundary. The permissible number of transmission attempts may be restricted by a timer.

Figure 5:
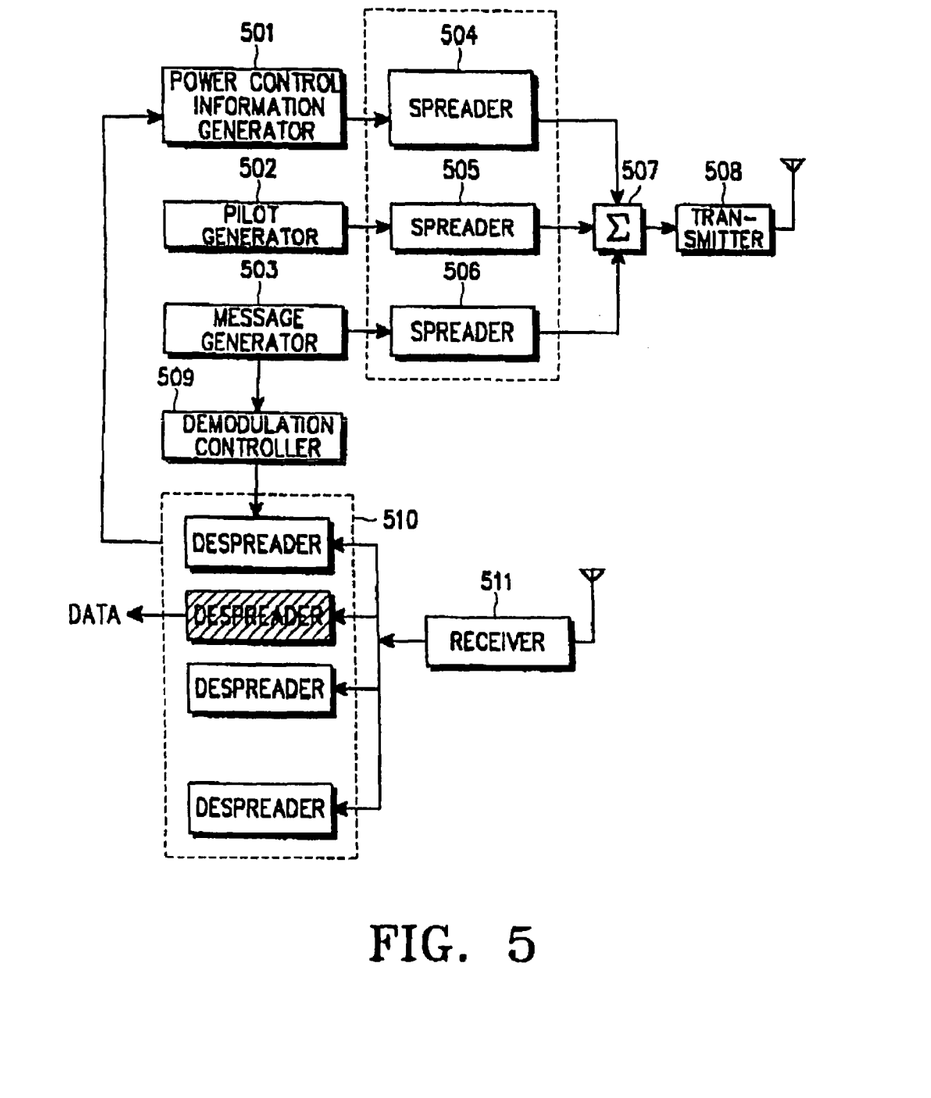
FIG. 5 is a block diagram illustrating a structure of a base station for a communication system according to an embodiment of the present invention.

FIG. 5 illustrates a base station device according to an embodiment of the present invention. Referring to FIG. 5, a power control information generator 501 generates power control information based on a received signal strength from the mobile station. A spreading modulator (or spreader) 504 spreads the power control information from the power control information generator 501 and provides the spread power control information to a summer 507. A pilot generator 502 generates a pilot signal. A spreading modulator 505 spreads the pilot signal from the pilot generator 502 and provides the spread pilot signal to the summer 507. A message generator 503 generates a forward message. For example, the message generator 503 generates a forward control message requiring a response (hereinafter, referred to as a response requiring control message), and the control message includes information about a designated long code to be used in responding. As an another example, the message generator 503 generates an access parameter message including information about preamble duration and slot duration having a length which is a multiple of 1.25 ms. A spreading modulator 506 spreads the message from the message generator 503 and provides the spread message to the summer 507. The summer 507 sums the output signals of the spreading modulators 504–506. A transmitter 508 frequency up-converts the summed signal from the summer 507 to a radio frequency signal and transmits the up-converted radio frequency signal through an antenna.

The message generator 503 also outputs reception mode information to a demodulation controller 509. The reception mode information may include slot length, preamble length, channel designation information, channel number, and data rate. The demodulation controller 509 controls the despreading of the demodulators 510 (or despreaders) to operate according to the reception mode information. For example, the demodulation controller 509 controls the demodulators 510 to detect a preamble beginning at the slot boundaries (or each start point of the slots) based on the slot length, and upon detecting a preamble, to demodulate the access message after a lapse of time corresponding to the preamble length. A receiver 511 frequency down-converts signals received through the antenna and provides the down-converted signal to the despreading demodulators 510. The despreading demodulators 510, under the control of the demodulation controller 509, despread the received signals from the receiver 511 and generate corresponding output data.

Figure 6:
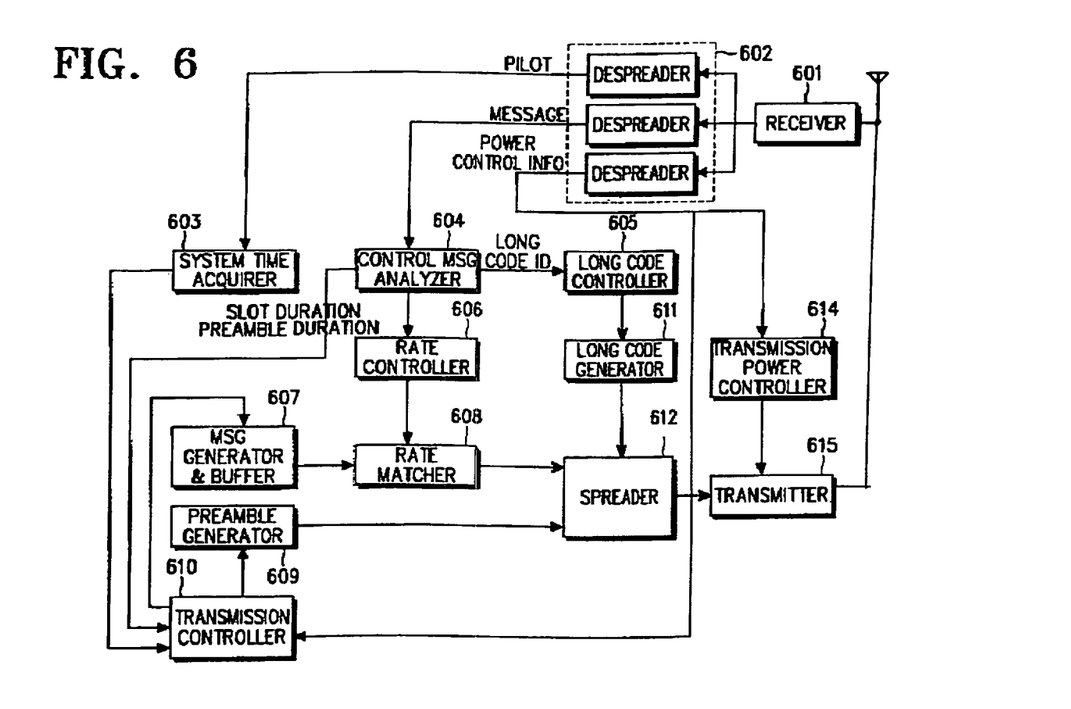
FIG. 6 is a block diagram illustrating a structure of a mobile station for the communication system according to an embodiment of the present invention.

FIG. 6 illustrates a mobile station device according to an embodiment of the present invention. Referring to FIG. 6, a receiver 601 receives a signal from the base station through an antenna, and provides the received signal to despreading demodulators 602. The despreading demodulators 602 despread the received signal from the receiver 601 and output pilot, a message and power control information, respectively. A control message analyzer 604 receiving the message from despreading demodulator 602, extracts data rate information and long code information from the received message, and provides the extracted data rate information and long code information to a data rate controller 606 and a long code controller 605, respectively. When the message is an access parameter message, the message analyzer 604 also provides slot duration information and preamble duration information included in the access parameter message to a transmission controller 610. The data rate controller 606 controls the operation of a rate matcher 608 according to the provided data rate information. The long code controller 605 controls operation of a long code generator 611 according to the provided long code information.

A system time acquirer 603 receiving the pilot from the despreading demodulator, acquires a system time from the received pilot, and provides the acquired system time to the transmission controller 610. The transmission controller 610 receives the system time from the system time acquirer 603 along with the slot duration information and the preamble duration information from the control message analyzer 604, and controls the transmission of the preamble and the message according to the received information. A message generator 607 generates a message and provides the generated message to the rate matcher 608. When necessary, the message generator 607 stores the generated message in its buffer. The rate matcher 608 receiving the generated message from the message generator 607, encodes the generated message at a data rate under the control of the data rate controller 606 and provides the encoded message to a spreading modulator 612. A preamble generator 609 generates a preamble and provides the generated preamble to the spreading modulator 612. The preamble generator 609 and the message generator 607 output a message and a preamble at a specific time, respectively, under the control of the transmission controller 610. Here, the transmission controller 610 controls the preamble generator 609 such that the preamble signal should be transmitted for the preamble duration beginning at the slot boundary designated by the base station, and controls the message generator 607 such that the message is transmitted following the preamble signal. The spreading modulator 612 spreads the message provided from the rate matcher 608 and the preamble signal provided from the preamble generator 609, and provides the spread signal to a transmitter 615. The transmitter 615 transmits the signal provided from the spreading modulator 612 through the antenna at power set according to a command from a transmission power controller 614.

Operation of the transmission controller 610, which plays an important role in the embodiment of the present invention, will be described more specifically. The transmission controller 610 controls the message generator 607 and the preamble generator 609 such that transmission of a preamble is started at the slot boundary designated by the base station as shown in FIG. 4 and a message should be successively transmitted. Further, the transmission controller 610 receives the power control information from the despreading demodulator 602. When the received power control information indicates a specific pattern indicating a failure to acquire a preamble, the transmission power controller 610 controls the message generator and buffer 607 and the preamble generator 609 such that transmission of the preamble and its associated message started again at the next slot boundary.

Figure 7A:
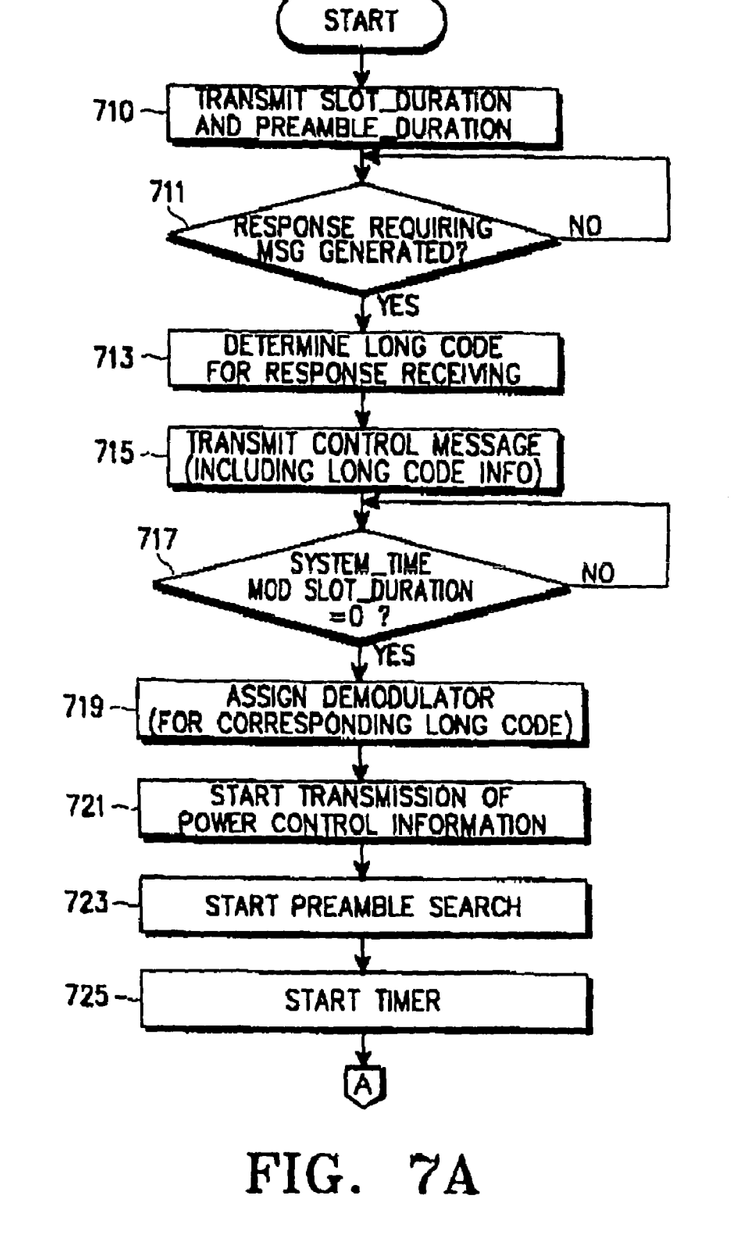
FIGS. 7A and 7B are flow charts illustrating an operation of the base station device for the communication system according to an embodiment of the present invention.
Figure 7B:
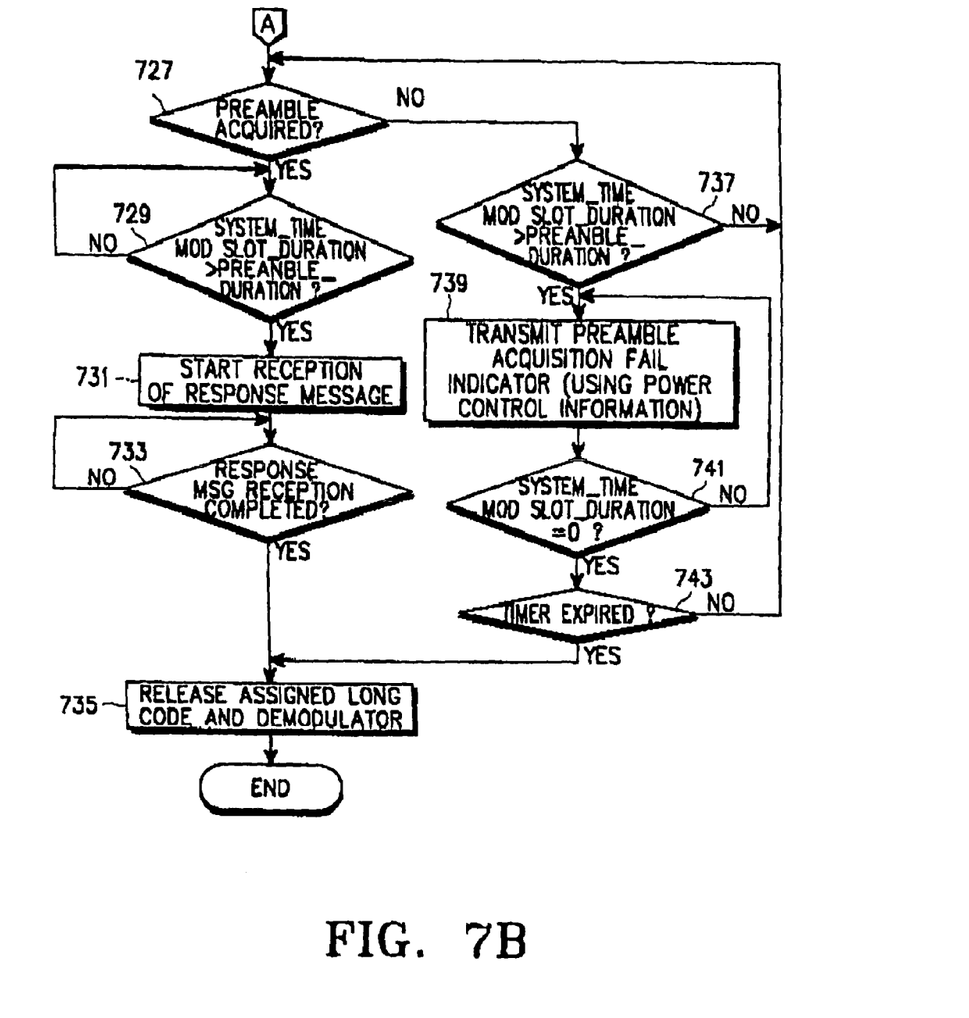

FIGS. 7A and 7B illustrate a procedure for the operation of the base station device in a communication system according to an embodiment of the present invention. Referring to FIGS. 7A and 7B, the base station transmits slot duration information and preamble duration information to the mobile station in step 710. Here, the slot duration indicates the time duration of a slot having a length which is a multiple of 1.25 ms, and the preamble duration indicates time duration for which a preamble signal is transmitted from a start time point of the slots according to the slot duration. The above two kinds of information are included in the access parameter message and transmitted from the base station to the mobile station. The base station continually monitors in step 711 to determine whether a response requiring control message has been generated. When the response requiring control message has been generated, the base station determines a designated channel (or long code) for receiving a response, in step 713. Thereafter, in step 715, the base station transmits the control message including the determined designated channel number (or designated long code information) to the mobile station.

Next, the base station in step 717 determines whether the system time is a multiple of the slot duration, i.e., whether SYSTEM_TIME mod SLOT_DURATION=0. Here, the system time is a reference time used in the system: every base station uses a common system time synchronized with one time origin and the mobile station uses, as a system time, a time delayed by propagation delay from the system time.

Here, the slot duration indicates the duration of one slot. Further, "mod" represents modulo operation. When the system time is a multiple of the slot duration, it is an indication that the system time is located at the slot boundary designated by the base station. When the system time is not a multiple of the slot duration in step 717, the base station continues to determine whether the system time becomes a multiple of the slot duration. Meanwhile, if the system time becomes a multiple of the slot duration, the base station assigns a demodulator for demodulating a channel which uses the determined long code for response receiving in step 719, and starts transmission of power control information in step 721.

The base station starts searching a preamble from the mobile station at the slot boundary in step 723, and activates a timer in step 725. Thereafter, the base station examines in step 727 whether a preamble from the mobile station has been acquired. When the preamble has not been acquired, the base station examines in step 737 whether the system time has passed the preamble duration from the slot boundary, i.e., whether SYSTEM_TIME mod SLOT_DURATION>PREAMBLE_LENGTH. If the preamble duration has not elapsed, the base station returns to step 727 to continuously examine whether the preamble is acquired. Otherwise, if the preamble duration has elapsed, the base station transmits a preamble acquisition fail indicator to the mobile station in step 739. Here, the preamble acquisition fail indicator is realized by transmitting power control commands in a specific pattern or discontinuing transmission of the power control commands.

The base station, which has failed to acquire the preamble, determines in step 741 whether the system time is a multiple of the slot duration, i.e., whether a value determined by performing modulo operation (or remainder operation) of the system time on the slot duration is equal to '0' (SYSTEM_TIME mod SLOT_DURATION=0). If the system time is not a multiple of the slot duration, the base station returns to step 739 to continuously transmit the preamble acquisition fail indicator. Otherwise, if the system time is a multiple of the slot duration, the base station determines in step 743 whether the timer has expired. If the timer has not expired, the base station returns to step 727 to continuously determine whether the preamble is acquired. Otherwise, if the time has expired, the base station releases the assigned long code and demodulator in step 735 and then ends the base station procedure according to the present invention.

Meanwhile, if the preamble is acquired in step 727, the base station examines in step 729 whether the system time has passed the preamble duration from the slot boundary, i.e., whether SYSTEM_TIME mod SLOT_DURATION>PREAMBLE_DURATION. If the preamble duration has not elapsed, the base station continuously receives the preamble until the preamble duration elapses. In the meantime, if the preamble duration has elapsed, the base station starts, in step 731, receiving a response message from the mobile station beginning at a time point where the preamble duration ends. Thereafter, the base station examines in step 733 whether reception of the response message is completed. If reception of the response message is not completed, the base station continuously receives the response message. Meanwhile, if reception of the response message is completed, the base station releases the assigned long code and demodulator in step 735 and then ends the base station procedure according to the present invention.

Figure 8A:
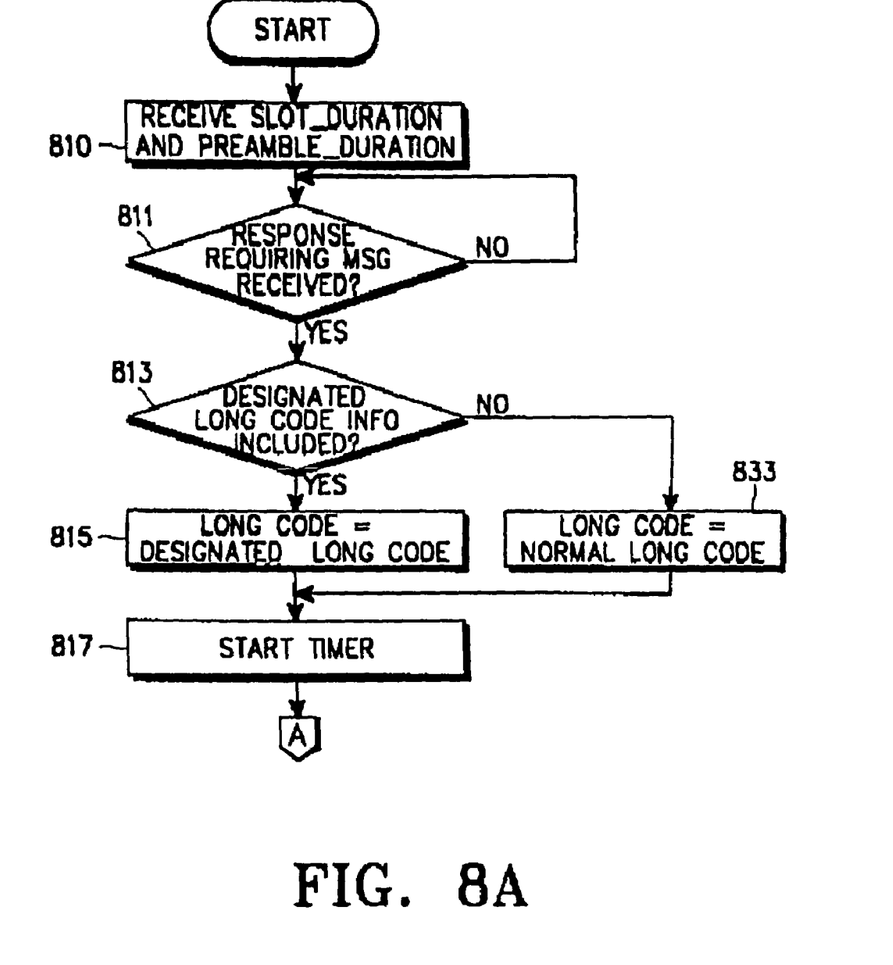
FIGS. 8A and 8B are flow charts illustrating an operation of the mobile station device for the communication system according to an embodiment of the present invention.
Figure 8B:
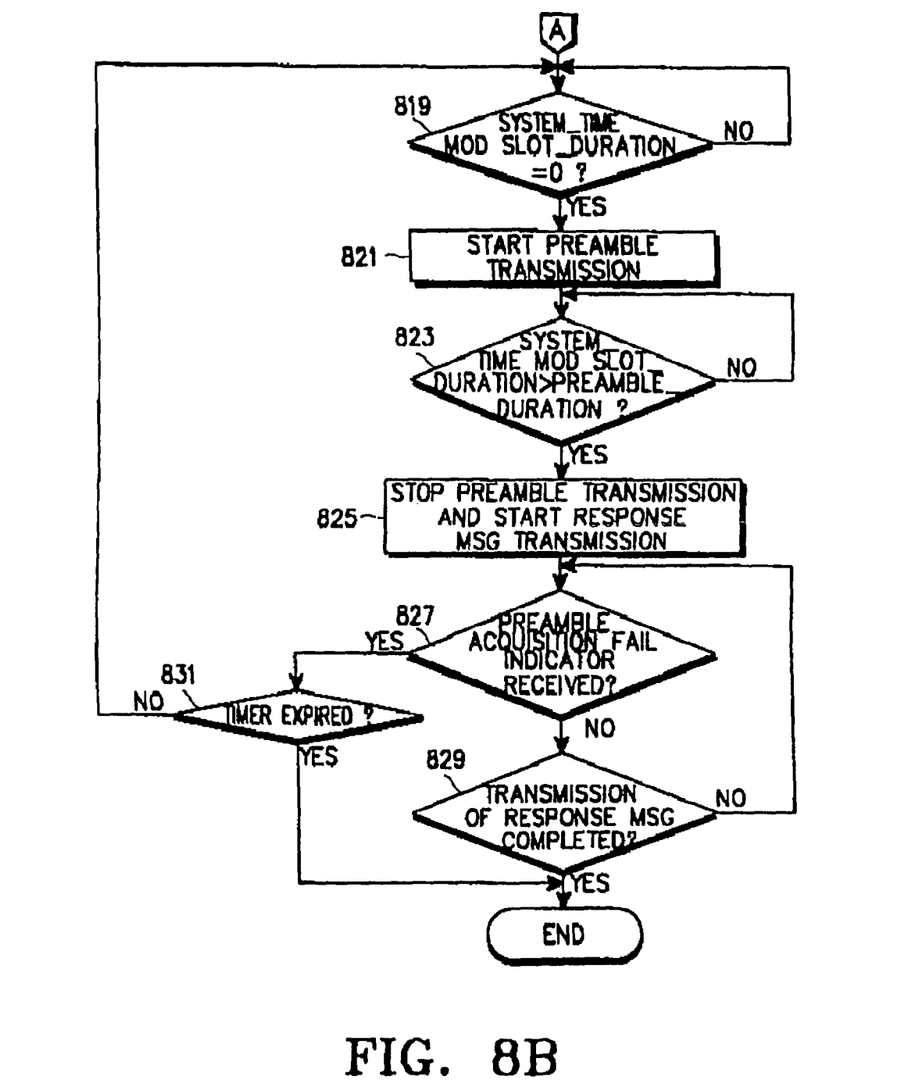

FIGS. 8A and 8B illustrate a procedure for the operation of the mobile station device in a communication system according to an embodiment of the present invention. Referring to FIGS. 8A and 8B, the mobile station receives the slot duration information and the preamble duration information from the base station in step 810. Here, the slot duration is information for determining a slot boundary where the mobile station attempts an access to the base station, and the preamble duration is information indicating a time interval, where the preamble is transmitted, from the slot boundary. The mobile station receives the above two types of information through an access parameter message from the base station. The mobile station examines in step 811 whether a response requiring message has been received from the base station. When the response requiring message has not been received, the mobile station continuously examines whether the response requiring message is received. Upon receipt of the response requiring message, the mobile station examines in step 813 whether the received message includes a designated channel number (or designated long code). If the message includes the designated long code, the mobile station sets the designated long code for a long code to be used for a response message in step 815. Otherwise, if the message does not include the designated long code information, the mobile station sets a long code, which is normally used for the common channel, for the long code to be used for a response message in step 833. After setting the long code, the mobile station activates a timer in step 817. The timer has the function of restricting a time for which the mobile station responds to the control message from the base station.

After activating the timer, the mobile station examines in step 819 whether the system time is a multiple of the slot duration, i.e., whether SYSTEM_TIME mod SLOT_DURATION=0. If the system time is not a multiple of the slot duration, the mobile station continuously examines whether the system time becomes a multiple of the slot duration in step 819. Meanwhile, if the system time becomes a multiple of the slot duration, the mobile station starts transmission of the preamble in step 821. Here, having the system time as a multiple of the slot duration is equivalent to the system time having reached the slot boundary designated by the base station.

After transmitting the preamble, the mobile station examines in step 823 whether the system time has passed the preamble duration from the slot boundary, i.e., whether SYSTEM_TIME mod SLOT_DURATION>PREAMBLE_DURATION. If the preamble duration has not elapsed, the mobile station continuously transmits until the preamble duration elapses. Meanwhile, if the preamble duration has elapsed, the mobile station stops transmission of the preamble and starts transmission of a response message in step 825.

The mobile station examines in step 827 whether a preamble acquisition fail indicator has been received from the base station. Here, the preamble acquisition fail indicator can be realized by transmitting power control commands in a specific pattern or discontinuing transmission of the power control commands in the base station. Therefore, the mobile station determines that base station has failed to acquire the preamble, if the power control commands in a specific pattern are received from the base station or no power control command is received from the base station.

Upon receipt of the preamble acquisition fail indicator, the mobile station determines in step 831 whether the timer activated in step 817 has expired. If the timer has not expired, the mobile station returns to step 819 to examine whether the system time is a multiple of the slot duration. Otherwise, if the timer has expired, the mobile station ends the mobile station procedure according to the present invention.

However, upon not receiving the preamble acquisition fail indicator in step 827, the mobile station determines in step 829 whether transmission of the response message is completed. If transmission of the response message is not completed, the mobile station continuously transmits the response message and then returns to step 827 to examine whether the preamble acquisition fail indicator is received. Otherwise, if transmission of the response message is completed, the mobile station ends the mobile station procedure according to the present invention.

As described above, the present invention has been described with reference to a method in which the mobile station attempts transmission of a preamble and a message on the basis of the slot designated by the base station in a designated access mode in which the base station designates a channel to be used when the mobile station responds to the control message from the base station. However, the reverse common channel transmission method can also be applied to another access mode. For example, the same transmission method can be applied even to a reservation access mode in which the mobile station transmits a reverse common channel, after receiving a confirmation message for a header transmitted to the base station.

As described above, in the novel communication system, during channel communication, the base station predicts a transmission time of the mobile station, so that the base station can efficiently operate the receiver based on the predicted transmission time.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for communicating between a base station and a mobile station through a designated channel, comprising the steps of:
   transmitting an access parameter message, including fields indicating a preamble duration and a slot duration, where the slot duration is a length of a multiple of a predetermined slot duration, from the base station to the mobile station, the base station previously knowing each start time point of each slot duration that is a multiple of the predetermined slot duration;
   transmitting a control message including fields indicating a designated channel number and a data rate from the base station to the mobile station over a common channel;
   receiving, in the mobile station, the control message and transmitting to the base station an access probe including a preamble having the preamble duration and a succeeding response message beginning at one of the start time points of the slot duration that is a multiple of the predetermined slot duration at the data rate through a designated channel associated with the designated channel number in the control message; and
   determining in the base station whether the preamble of the access probe is received, beginning at each of the start time points of the slot durations that is a multiple of the predetermined slot duration.

2. A base station device comprising:
a forward common channel transmitter for transmitting through a forward common channel an access parameter message including preamble duration information and information about a second slot duration having a length of a multiple of a given first slot duration; and
a controller for examining whether an access probe including a preamble signal having the preamble duration and a succeeding access message is received, beginning at each start time point of slots based on the second slot duration.

3. The base station device as claimed in claim 2, wherein the first slot duration is 1.25 ms.

4. The base station device as claimed in claim 2, wherein the forward common channel transmitter transmits a control message including a designated channel number for a reverse common channel to a mobile station over a forward common channel.

5. The base station device as claimed in claim 4, wherein the mobile station receives the control message and transmits the access probe over a designated channel associated with the designated channel number in the control message beginning at one of the start time points of the slots based on the second slot duration.

6. The base station device as claimed in claim 5, wherein the controller transmits a preamble acquisition fail indicator to the mobile station, upon failure to detect a preamble signal of the access probe until the preamble duration has elapsed from the slot start time point.

7. The base station device as claimed in claim 6, wherein the preamble acquisition fail indicator is implemented by transmitting power control commands in a specific pattern.

8. The base station device as claimed in claim 6, wherein the preamble acquisition fail indicator is implemented by discontinuing transmission of power control commands for specific duration.

9. A mobile station device comprising:
a forward common channel receiver for receiving through a forward common channel an access parameter message including preamble duration information and information about a second slot duration having a length of a multiple of a given first slot duration; and
a reverse common channel transmitter for transmitting an access probe including a preamble signal having the preamble duration and a succeeding access message to a base station over a reverse common channel beginning at one of a plurality of start time points of the slots having the second slot duration, thereby accessing the base station.

10. The mobile station device as claimed in claim 9, wherein the first slot duration is 1.25 ms.

11. The mobile station device as claimed in claim 9, wherein the reversed common channel is a reverse common control channel (R-CCCH).

12. The mobile station device as claimed in claim 9, wherein the reverse common channel transmitter retransmits the access probe beginning at a start time point of the next slot, upon detecting a preamble acquisition fail indicator from the base station after transmitting the preamble of the access probe.

13. The mobile station device as claimed in claim 12, wherein the preamble acquisition fail indicator is detected by receiving power control commands in a specific pattern.

14. The mobile station device as claimed in claim 12, wherein the preamble acquisition fail indicator is detected by receiving no power control command for a specific time duration.

15. The mobile station device as claimed in claim 9, wherein the reverse common channel transmitter transmits, upon receipt of a control message including a designated channel number for a reverse common channel from the base station, the access probe over a designated channel associated with the designated channel number in the control message beginning at one of the start time points of the slots having the second slot duration.

16. An access communication device for a mobile communication system, comprising:
a base station device for transmitting an access parameter message including preamble duration information and information about a second slot duration having a length of a multiple of a given first slot duration, and receiving an access probe including a preamble signal having the preamble duration and a succeeding access message at one of the start time points of slots based on the second slot duration; and
a mobile station device for receiving the access parameter message, and transmitting the access probe beginning at one of the start time points of the slots based on the second slot duration.

17. A communication method for a base station, comprising the steps of:
transmitting to a mobile station an access parameter message including preamble duration information and information about second slot duration having a length of a multiple of a given first slot duration;
transmitting to the mobile station a control message including a designated channel number for a reverse common channel;
determining whether a preamble signal of an access probe is received, by assigning a demodulator associated with the designated channel number beginning at each start time point of slot boundaries based on the second slot duration; and
upon receipt of the preamble signal, receiving a response message for the control message after a lapse of the preamble duration.

18. The communication method as claimed in claim 17, further comprising the step of transmitting a preamble acquisition fail indicator to the mobile station, upon failure to receive the preamble signal.

19. The communication method as claimed in claim 17, wherein the designated channel number is a specific long code number.

20. The communication method as claimed in claim 17, wherein the first slot duration is 1.25 ms.

21. A communication method for a mobile station, comprising the steps of:
receiving from a base station an access parameter message including preamble duration information and information about a second slot duration having a length of a multiple of a given first slot duration;
receiving from the base station a control message including information about a designated channel for a reverse common channel;
transmitting to the base station a preamble signal for the preamble duration beginning at one of a plurality of start time points of slots based on the second slot duration; and
after transmitting the preamble signal, consecutively transmitting a response message for the control message to the base station over a designated channel associated with a designated channel number.

22. The communication method as claimed in claim 21, further comprising the step of retransmitting the preamble signal and the response message beginning at a start time point of a next slot, upon receipt of a preamble acquisition fail indicator from the base station.

23. The communication method as claimed in claim 21, wherein the designated channel number is a specific long code number.

24. The communication method as claimed in claim 21, wherein the first slot duration is 1.25 ms.

25. An access communication method for a mobile communication system, comprising the steps of:
  transmitting an access parameter message including preamble duration information and information about a second slot duration having a length of a multiple of a given first slot duration from a base station to a mobile station;
  transmitting a control message including a designated channel number for a reverse common channel from the base station to the mobile station;
  upon receipt of the control message, transmitting, in the mobile station, an access probe including a preamble signal having the preamble duration and a succeeding response message over a designated channel associated with the designated channel number beginning at one of a plurality of start time points of slots based on the second slot duration; and
  after transmitting the control message, determining in the base station whether a preamble signal of the access probe is received, by assigning a demodulator associated with the designated channel number beginning at each start time point of slots based on the second slot duration; and
  upon receipt of the preamble signal, receiving in the base station the response message for the control message after a lapse of the preamble duration.

* * * * *